(12) United States Patent
Mejia et al.

(10) Patent No.: US 7,542,402 B2
(45) Date of Patent: Jun. 2, 2009

(54) CONTACT PROBE STORAGE FET SENSOR AND WRITE HEATER ARRANGEMENTS

(75) Inventors: Robert Guido Mejia, Boise, ID (US); Richard Lee Hilton, Boise, ID (US)

(73) Assignee: Seagate Technology LLC, Scotts Valley, CA (US)

(*) Notice: Subject to any disclaimer, the term of this patent is extended or adjusted under 35 U.S.C. 154(b) by 774 days.

(21) Appl. No.: 10/827,370

(22) Filed: Apr. 20, 2004

(65) Prior Publication Data

US 2005/0135200 A1    Jun. 23, 2005

Related U.S. Application Data

(63) Continuation-in-part of application No. 10/736,600, filed on Dec. 17, 2003.

(51) Int. Cl.
G11B 7/00 (2006.01)
(52) U.S. Cl. ...................................................... 369/126
(58) Field of Classification Search .................. None
See application file for complete search history.

(56) References Cited

U.S. PATENT DOCUMENTS

| | | | |
|---|---|---|---|
| 3,920,930 A | | 11/1975 | Sobczyk et al. |
| 5,323,377 A | | 6/1994 | Chen et al. |
| 5,729,026 A | * | 3/1998 | Mamin et al. ............ 250/492.2 |
| 5,835,477 A | | 11/1998 | Binnig et al. |
| 6,079,255 A | | 6/2000 | Binnig et al. |
| 6,101,164 A | | 8/2000 | Kado et al. |
| 6,291,140 B1 | | 9/2001 | Andreoli et al. |
| 6,304,527 B1 | | 10/2001 | Ito et al. |
| 6,477,132 B1 | * | 11/2002 | Azuma et al. ............... 369/126 |
| 6,515,277 B1 | | 2/2003 | Kley |
| 6,518,570 B1 | | 2/2003 | Hough et al. |
| 6,583,411 B1 | | 6/2003 | Altmann et al. |

(Continued)

FOREIGN PATENT DOCUMENTS

WO    WO 02/37488    5/2002

(Continued)

OTHER PUBLICATIONS

E. Thielicke et al., "Microactuators and Their Technologies", Technical University of Berlin, Microsensor & -actuator Technology Center (MAT), (30 pgs.), Dec. 17, 2003.

Primary Examiner—Joseph Feild
Assistant Examiner—Joseph Haley
(74) Attorney, Agent, or Firm—Robert P. Lenart, Esq.; Benjamin T. Queen, II; Petragallo Gordon Alfano Bosick & Raspanti, LLP

(57) ABSTRACT

A read/write arrangement for a contact probe storage arrangement or the like, has a cantilever disposed with a medium which is movable relative to the cantilever. A device which is associated with one of the cantilever and the medium is configured to be responsive to changes in electrical field between the medium and the cantilever caused by a change in distance between the medium and the cantilever. A heater is disposed on the cantilever for heating the medium and for inducing localized topographical changes which represent bits of data. A circuit electrically interconnects both of the device and the heater.

12 Claims, 12 Drawing Sheets

U.S. PATENT DOCUMENTS

| | | | |
|---|---|---|---|
| 7,054,257 B2 * | 5/2006 | Binnig et al. | 369/126 |
| 2001/0019461 A1 | 9/2001 | Allenspach et al. | |
| 2002/0008304 A1 | 1/2002 | Gunbae et al. | |
| 2002/0066855 A1 | 6/2002 | Jae-Joon et al. | |

FOREIGN PATENT DOCUMENTS

| | | |
|---|---|---|
| WO | WO 03/042627 | 5/2003 |

* cited by examiner

US 7,542,402 B2

CONTACT PROBE STORAGE FET SENSOR AND WRITE HEATER ARRANGEMENTS

CROSS REFERENCE TO RELATED APPLICATIONS

The present application is a continuation-in-part of a U.S. patent application Ser. No. 10/736,600 filed on Dec. 17, 2003 in the name of Robert G. Mejia and Richard Lee Hilton, the entire contents of which are hereby incorporated by reference.

BACKGROUND OF THE INVENTION

The present invention relates to a read/write arrangement for Contact Probe Storage (CPS) arrangements and the like, wherein a heater is used to heat a medium and modify its topography so that data bits are written thereinto, and wherein a read sensor arrangement, which is based on a FET (Field Effect Transistor), responds to changes in distance from a substrate that supports the medium and emits an electric field, induced by the modified topography.

Currently, data written onto a movable medium can be sensed by a probe supported on a cantilever used to contact the movable medium. A heated element (heater) is provided in the cantilever proximate the probe. The heater is heated by passing a current of electricity therethrough. By using heat transfer characteristics between the movable medium and the probe (or a portion of the cantilever in which the heating element is formed), it is possible to determine minute changes in distance between the movable medium and the cantilever on which the probe is carried, and to use this as a means for reading out the data stored on the movable medium.

The heater in the cantilever can be used for both reading and writing. The reading function uses a thermal readback sensor arrangement which exploits a temperature-dependent resistance function. In this arrangement, the resistance (R) increases nonlinearly with heating power/temperature from room temperature to a peak value of 500-700° C. (writing). The peak temperature is determined by the doping concentration in the heater platform, which ranges from $1\times10^{17}$ to $2\times10^{18}$. Above the peak temperature, the resistance drops as the number of intrinsic carriers increases because of thermal excitation.

During sensing, the resistor is operated at about 200° C. This temperature is not high enough to soften the polymer medium to the degree necessary for writing. However, this temperature is high enough to allow molecular energy transfer between the cantilever on which the probe is carried, and the moving medium. This transfer removes heat and thus provides a parameter, which allows the distance between the cantilever on which the probe is carried and the medium on which the probe is running, to be measured.

That is to say, this thermal sensing is based on the fact that the thermal conductance between the heater platform and the storage substrate changes according to the distance between them. The medium between a cantilever and the storage substrate, in this case air, transports heat from one side of the heater/cantilever to the storage media/substrate. When the distance between heater and media is reduced as the probe moves into a bit indentation, heat is more efficiently transported through the air, and the heater's temperature (and hence its resistance) decreases. Thus, changes in temperature of the continuously heated resistor are monitored while the cantilever is scanned over data bits, providing a means of detecting the bits.

Under typical operating conditions, the sensitivity of the thermomechanical sensing is even better than that of piezoresistive-strain sensing inasmuch as thermal effects in semiconductors are stronger than strain effects. A ΔR/R sensitivity of about $10^{-4}$/nm is demonstrated by the images of the 40-nm-size bit indentations. This is better than the results obtained using the piezoresistive-strain technique.

Nevertheless, the thermal response has been found to be slower than desired and is significantly slower than the cantilever's ability to mechanically follow the data pattern written in the medium. This leads to the system's read performance being slower than it would be if it were not limited by the thermal response of the sensing system.

DETAILED DESCRIPTION OF THE EXEMPLARY EMBODIMENTS

Figure 1:
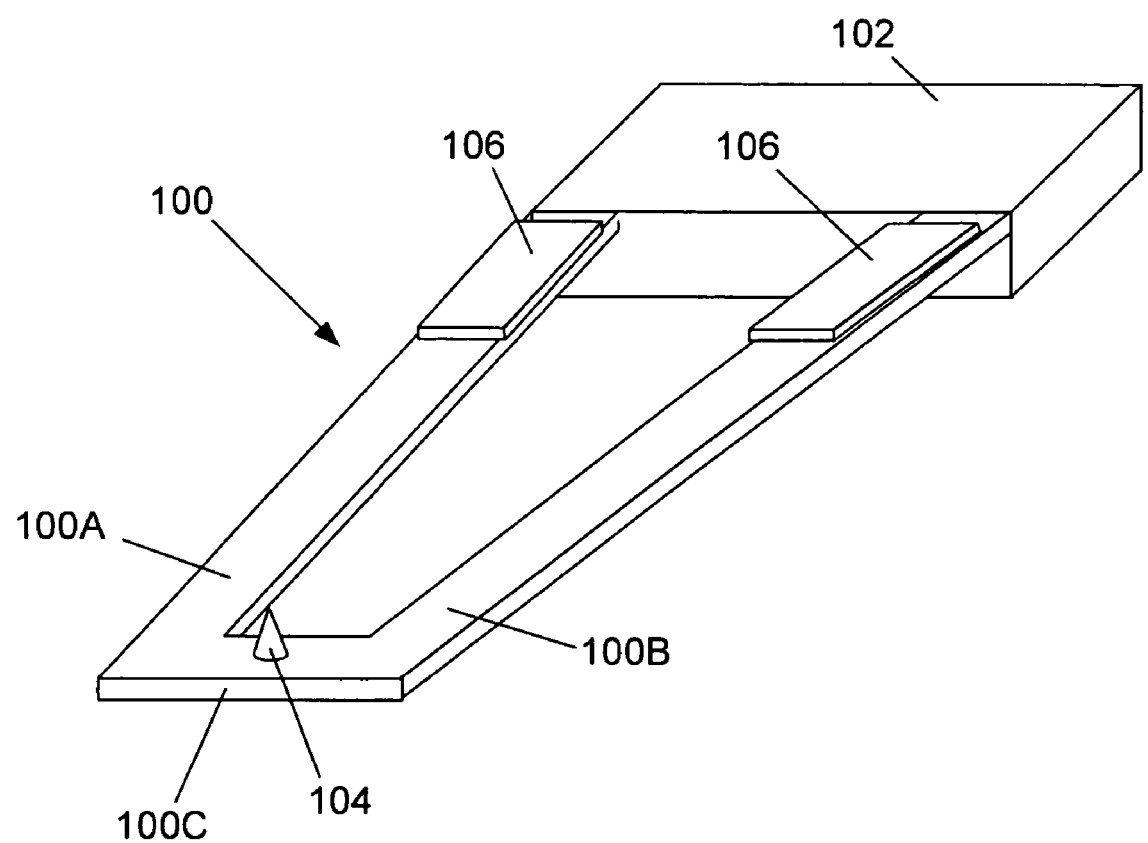
FIG. 1 is a schematic perspective view of a cantilever (media facing side up) which has a probe and to which embodiments of the invention are applicable.
Figure 2A:
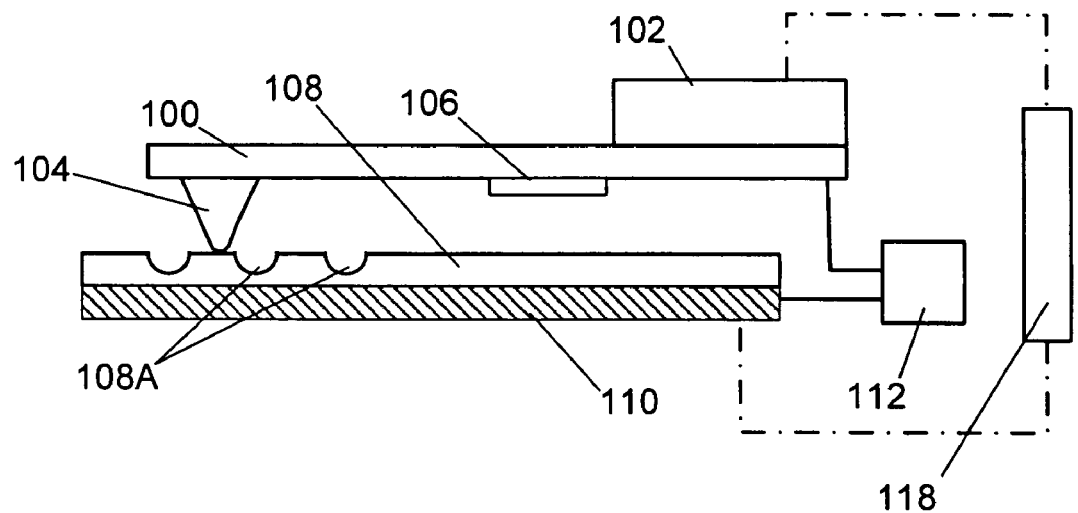
FIGS. 2A and 2B are respectively schematic side views showing the cantilever disposed with a medium in which data bits have been written by a heater which is incorporated into the embodiments of the invention, and the change in distance which is induced when a probe on the cantilever engages a flat surface of the substrate/enters or locates a data indicative topographical change.
Figure 2B:
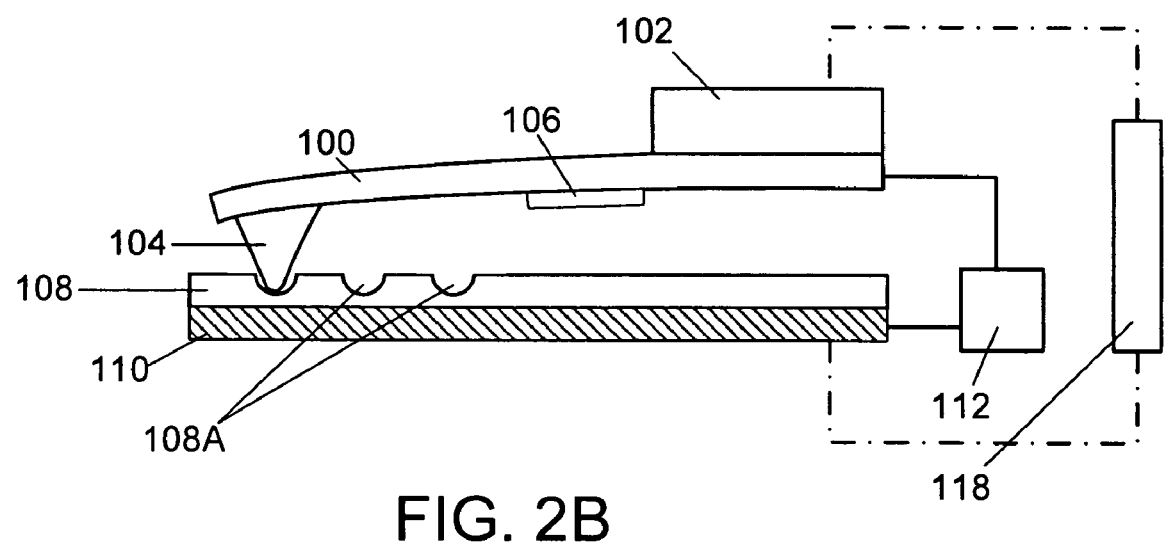

FIGS. 1, 2A and 2B show a cantilever arrangement of the type to which the embodiments of the invention can be applied. The cantilever 100 is supported at its inboard end on a base member 102 and is formed at its outboard end with a probe 104. In the illustrated arrangement, the cantilever 100 comprises two arms 100A, 100B the outboard ends of which are interconnected by an end bridge member 100C.

The probe 104 is formed on the end bridge member 100C. The probe 104 is formed using suitable masking and etching, or a like type of fabrication technique, so as to be at least in part electrically non-conductive.

Layers of activation material 106 are disposed on the arms of the cantilever 100 to control the flexure of the cantilever toward a medium 108 which is movable with respect to the cantilever 100 or vice versa. The activation material 106, however, is not limited to the use of intrinsically stressed material and can be alternatively formed of a piezoelectric material if so desired.

The medium 108 is comprised of a layer of heat deformable material such as polycarbonate or polymethylmethacrylate (PMMA) for example, which is formed over the surface of a suitable support substrate. The medium 108, which in this case is non-conductive, can be heated locally to write data by fusing and changing the medium topography to the degree that the changes can be detected using the probe 104 in the manner depicted in FIGS. 2A and 2B. The medium 108 is supported on a substrate 110 which in this instance is electrically conductive and is electrically connected to a sensor circuit 112 which is adapted to apply a bias to the substrate 110 and produce an electric field which can be used to gate a FET.

Thus, when the medium 108 or the cantilever 100 has been moved relative to the other to assume an exact coordinate relationship, the cantilever can be moved toward the medium. In the event that a pit 108A (or isolated hump) is located under the probe 104 in the manner schematically depicted in FIG. 2A, the entry of the probe 104 into the pit (or engagement with the top of the hump) indicates the presence of a data bit. If the probe 104 does not find a pit or a hump and seat on the flat surface of the medium such as depicted in FIG. 2A then an absence of a data bit is indicated.

Additionally, the bits may be coded such that a particular change from one state (pit, hump or flat surface) to another state would indicate a bit and other states or changes would indicate the lack of a bit. The invention can use other coding techniques employed in contact storage device detection patterns or other responses that are predominant in the response of the sensor-media systems.

The topography of the medium 108 is thus such that the distance or gap between the medium 108 and a cantilever 100 on which the probe 104 is formed, varies. This distance variation allows a FET (field effect transistor) 114, which is formed in the cantilever 100 proximate the probe, to respond to changes in the electric field which is generated between the substrate 110 and the cantilever 100. This distance variation modulates a signal in the form of a current which passes through the FET 114 in accordance with the amount of clearance between the medium 108 and the cantilever 100.

The sensor circuit 112 is also arranged to be responsive to the change in current passing through the FET 114 and thus detect the change in distance between the cantilever 100 and the substrate 110. In the embodiments of the invention, a heater 116 is circuited with the FET 114 and is arranged to be supplied power via conductive traces or lines which are formed in the cantilever 100 such as by doping (ion implantation or the like) and which are common to both the heater 116 and the FET 114.

Figure 3:
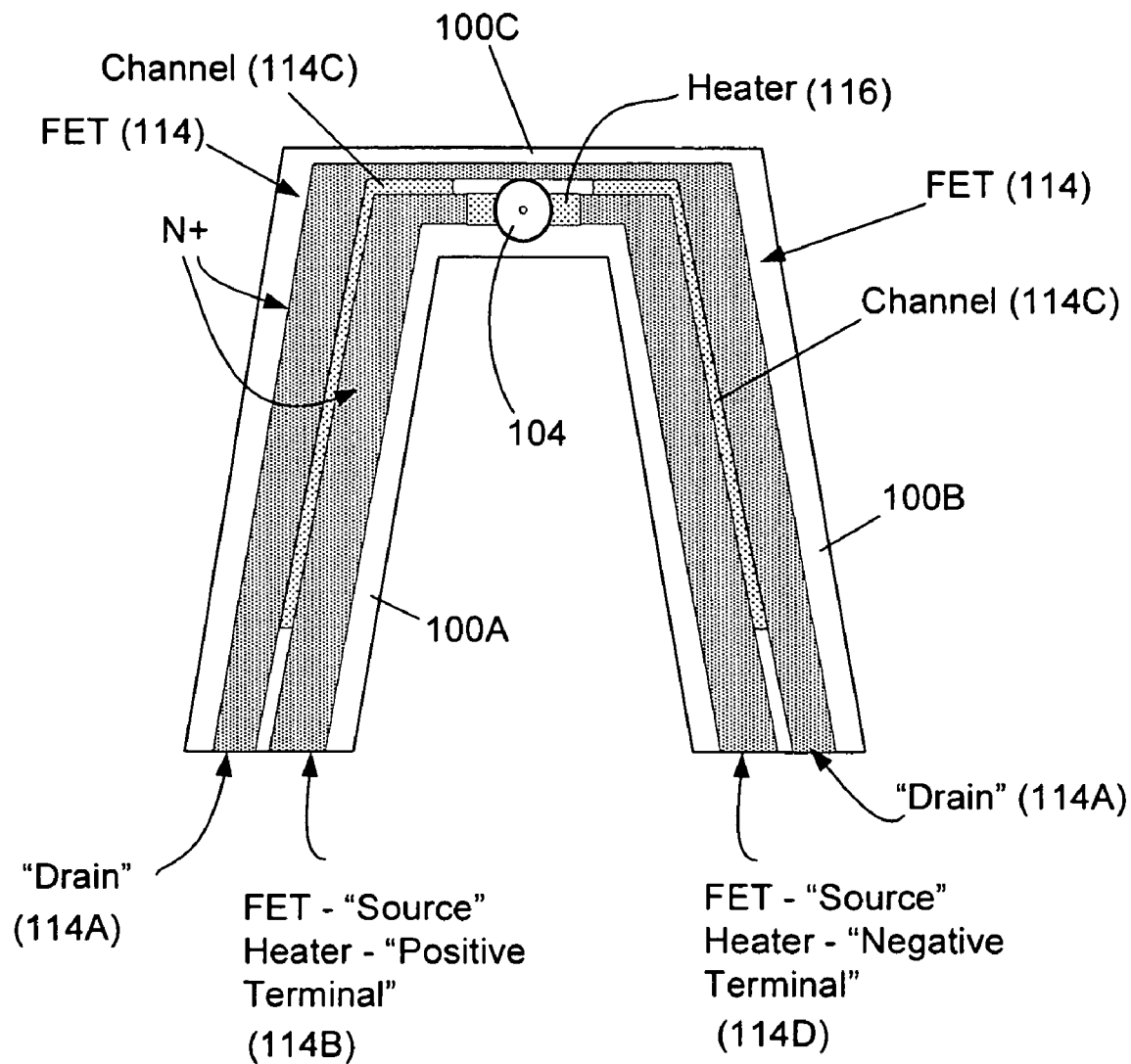
FIG. 3 is a schematic probe-side plan view of the cantilever showing a heater/FET arrangement according to a first embodiment of the invention.

A first embodiment of the invention is schematically illustrated in FIG. 3. It should be noted however, that the portion of the cantilever 100 which is depicted in FIGS. 3-6, is merely an end portion of the cantilever 100 that is able to move toward and away from the medium 108. As shown, the heater 116 is formed as an electrically conductive region having a suitable resistance, in a portion of the cantilever 100 which is located immediately proximate the probe 104.

The resistance of the heater 116 can be controlled by controlling the doping concentration with respect to that of the traces on either side which are more heavily doped and thus more conductive. As will be appreciated, the probe 104 itself can form part of the heater to facilitate localized heating and fusing of the medium 108.

The cantilever 100, in this embodiment, is formed of silicon which has been masked, etched and doped in a known manner to produce the illustrated configuration and electrically conductive lines or traces 114A, 114B, 114C and 114D. These traces define the source, drain and channel of the FET 114 as well as the circuit via which the heater 116 is operated.

In addition to writing, the heater 116 can also be used to heat and induce softening and reflow of localized areas of the medium to smooth out and erase a data indicative recess or hump. Needless to say, the heater must be maintained in proximity to this portion of the medium but with the probe 104 out of contact therewith.

The change in distance between the portion of the cantilever 100 in which the FET 114 is formed and the medium which occurs in the manner depicted in FIGS. 2A and 2B, is sufficient to change the electrical field strength in the channel region of the FET. This induces the situation wherein the change in proximity of the cantilever 100 to the substrate 108 varies the gating of the FET 114 and modulates the current which is permitted to flow from the drain 114A to the source 114B and 114D through the channel 114C which is interposed between the two.

The FET 114 is formed only along the lower portions of the cantilever 100 and is formed only in the portions of the cantilever 100 that actually move in response to the probe encountering a topographical change. The formation of the FET 114 on the lower surface of the cantilever facilitates production, provides a greater W/L ratio, and a greater sensor area and gain. The formation of the FET 114 on portions of the cantilever which do not undergo much movement is avoided to avoid contribution to DC current and noise.

Since the probe 104 moves over/contacts an electrically non-conductive medium 108, the modulation of the current passing through the FET 114 is due solely to the changes in the electrical field which are produced between the cantilever 100 and the substrate 110 which of course must be sufficiently conductive to allow for the required electrical field to be established.

During the read mode of operation, trace 114A, which extends continuously along both legs 100A, 100B and across the end bridge 100C, acts as a common drain while traces 114B and 114D act as sources for what is essentially two halves of the FET. Features 114C, in this embodiment, form channels which separate the drains and sources of the FET arrangement.

The bias applied to the substrate 110 gates the FET allowing current to pass through the two channel portions 114C which are formed. Current flow between the common drain and the two source halves is used to derive a read signal. Since traces 114B and 114D are both used as "sources" during this time, no current flow through the heater 116 occurs.

During the heating/write mode of operation, the bias to the substrate 110 is lowered to the point where gating of the FET does not occur. At this time the roles of traces 114B and 114D are changed so that one acts as the positive terminal for the heater 116 while the other acts as the negative terminal. Electrical current is therefore induced to pass through the heater 116.

The switching arrangement which allows this change between read and write modes of operation is well within the purview of the person of skill in the art of electrical controls and thus no further discussion will be given for the sake of brevity.

The FET 114 shown in FIG. 3 is a depletion mode N-channel type FET. However, the embodiment is not limited to this type of FET and may be replaced with a P-channel type if desired. In depletion mode FETs, the channel is formed by doping in the channel region. The FET will conduct in varying amounts as modulated by the gate voltage. If the gate voltage is made negative enough, the carriers will be driven from the channel causing the FET to cease to conduct.

As shown in FIGS. 2A and 2B the medium 108 and the cantilever 100 are operatively (mechanically) interconnected so that medium 108 is selectively movable with respect to the cantilever 100 by way of a drive mechanism denoted by element 118 (schematically depicted in FIG. 2). This mechanism is arranged to move the two elements (viz., the cantilever 100 and the medium 108) with respect to one another so as to assume a selected coordinate relationship and position the probe 104 so that it can detect if a data indicative of a change in topography (e.g. a pit 108A) is present or absent at that set of coordinates.

With this embodiment, a good sensor bandwidth can be expected inasmuch as the electric field responds as fast as the cantilever can move. The FET is thus able to respond quickly to the variations in field strength and has the potential to make the mechanics of the cantilever the limiting factor in the bandwidth. The signal to noise ratio (SNR) for this arrangement can be expected to be improved as compared to the above-mentioned thermal type sensor in that, with the latter, much of the useful signal is filtered out by the thermal low-pass function.

Since the FET is capable of producing gain, the sensing aspect of the embodiments can be expected to produce a relatively large output signal with respect to the various noise sources and thus reduce signal degradation due to these noises.

While the embodiment of FIG. 3 has been disclosed as including a depletion mode FET, it is possible, in this and the other embodiments of the invention, to use an induced-channel type FET. This induced-channel or enhancement mode FET is such that there is no intrinsic channel and the drain to source conductance is very low until the gate voltage is applied. When the gate voltage exceeds a given threshold, enough carriers are pulled into the channel region that the device starts to conduct. In an N-channel enhancement type FET, the channel is p-type material that forms a conduction band when sufficiently positive gate voltage is applied. When conducting, the channel behaves like n-type material.

Figure 4:
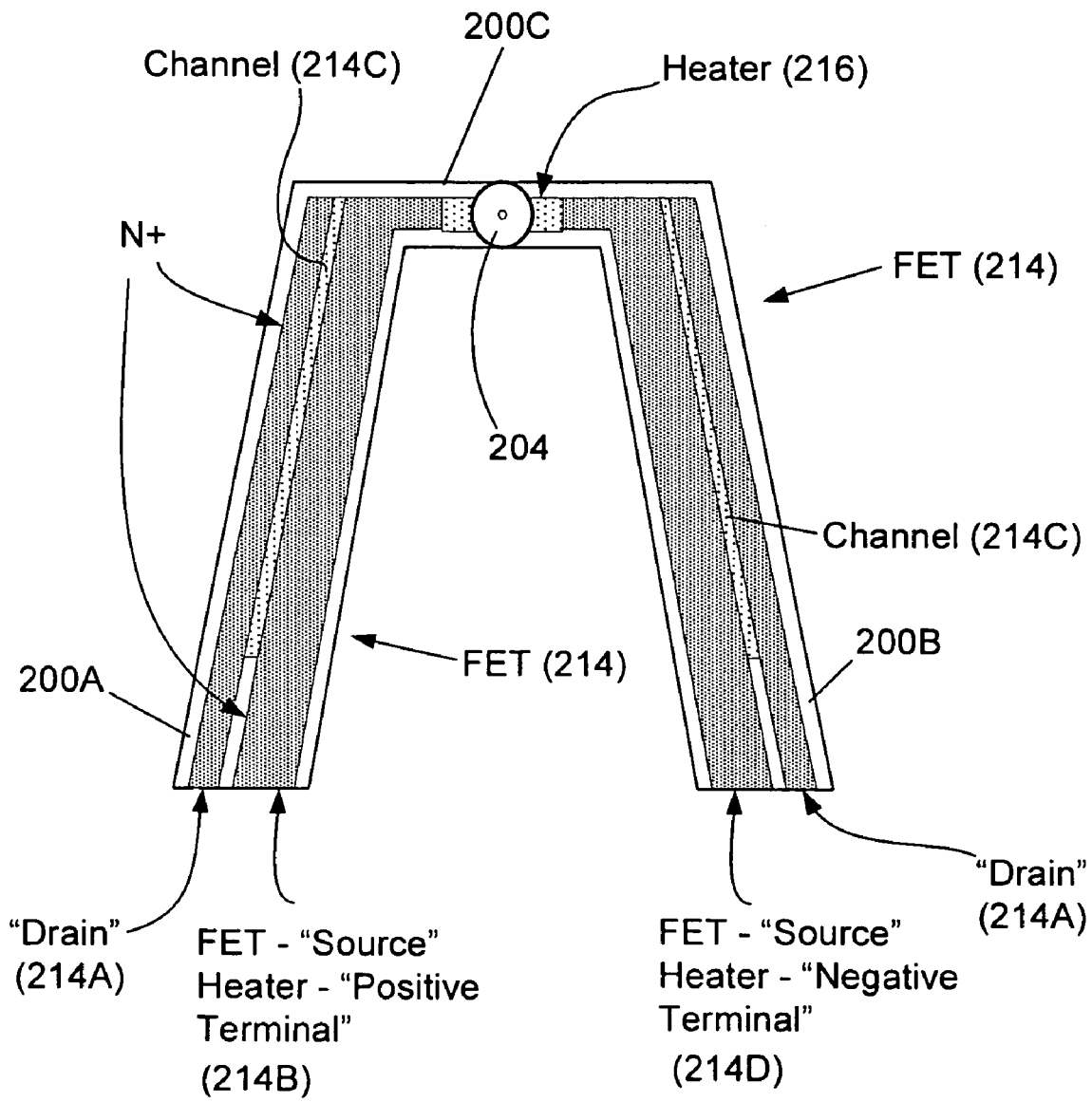
FIG. 4 is a schematic underside plan view of the cantilever showing a heater/FET arrangement according to a second embodiment of the invention.

FIG. 4 shows a second embodiment of the invention. In this embodiment the doped traces which form left and right hand side portions of the FET 214 are simplified. This configuration allows the end bridge 200C of the cantilever 200 to be narrowed and to add a minimum of thermal mass to the area of the cantilever 200 proximate the probe 204. It also limits the thermal conductivity out into the legs of the cantilever.

With the heater 216 interposed in the illustrated manner, the outboard traces both act as drains for the FET 214 while the inboard traces act as sources during the read mode and are switched in the same manner as disclosed in connection with the first embodiment shown in FIG. 3.

Figure 5:
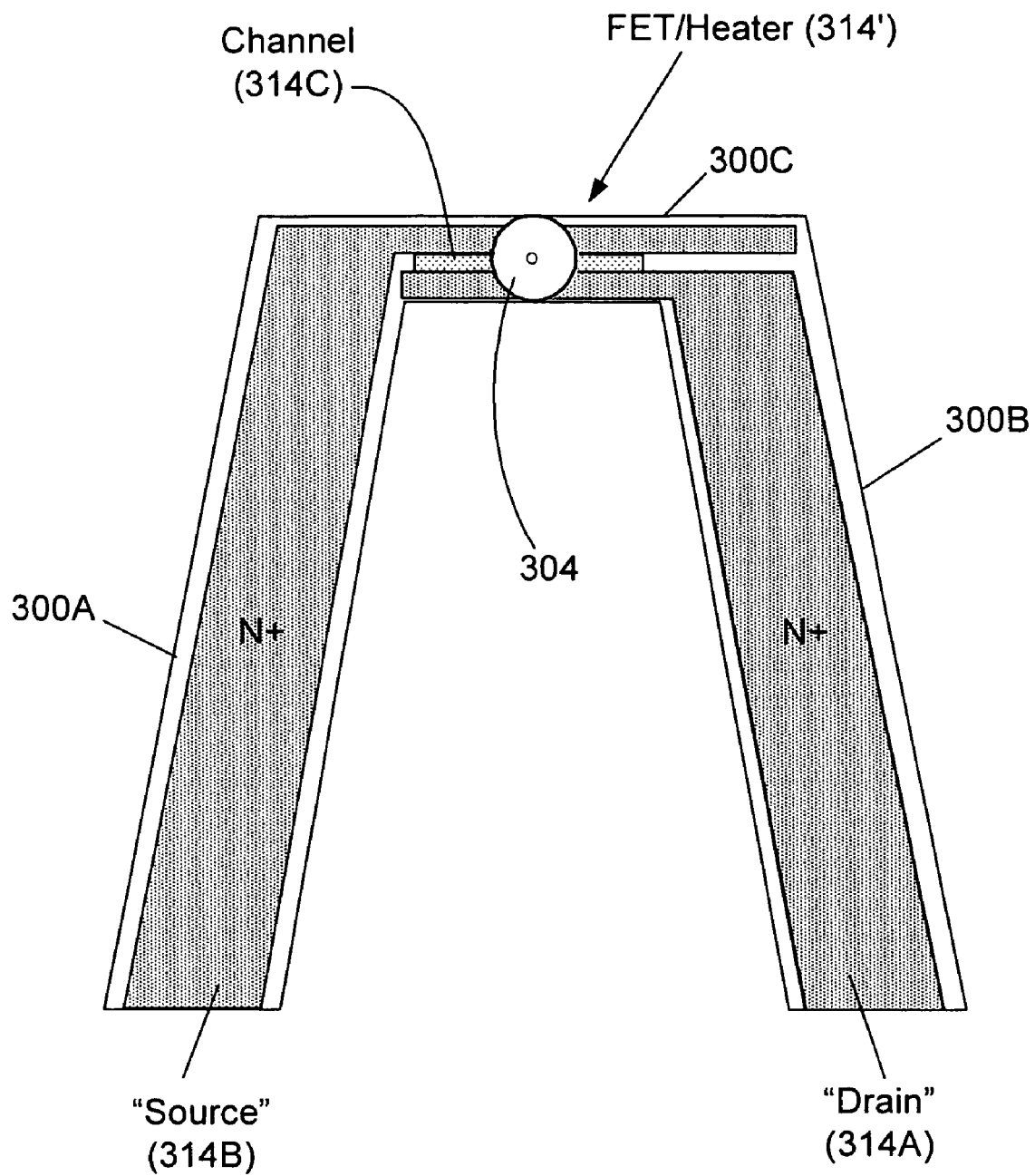
FIG. 5 is a schematic underside plan view of the cantilever showing a heater/FET arrangement according to a third embodiment of the invention.

FIG. 5 shows a third embodiment of the invention. In this embodiment the FET 314' also acts as the heater during the heating mode and is such that the geometry of the FET elements maximizes the width of the FET in the vicinity of the probe 104. This embodiment accordingly has only one source 314B and one drain 314A.

The switching between the reading and writing mode is achieved by operating the source and drain at voltages such that the FET was turned on partially. This places the channel in a state of medium conductivity where there would be a lot of voltage drop across it. Assuming that the substrate potential was fixed, the source voltage could be set to a value to establish the "on resistance" of the FET and the drain could be set to a voltage to cause the desired amount of power to be dissipated.

With this technique however, the power density in the channel may tend to be too high and the control of the FET may require accurately controlled voltages and the like.

Figure 6:
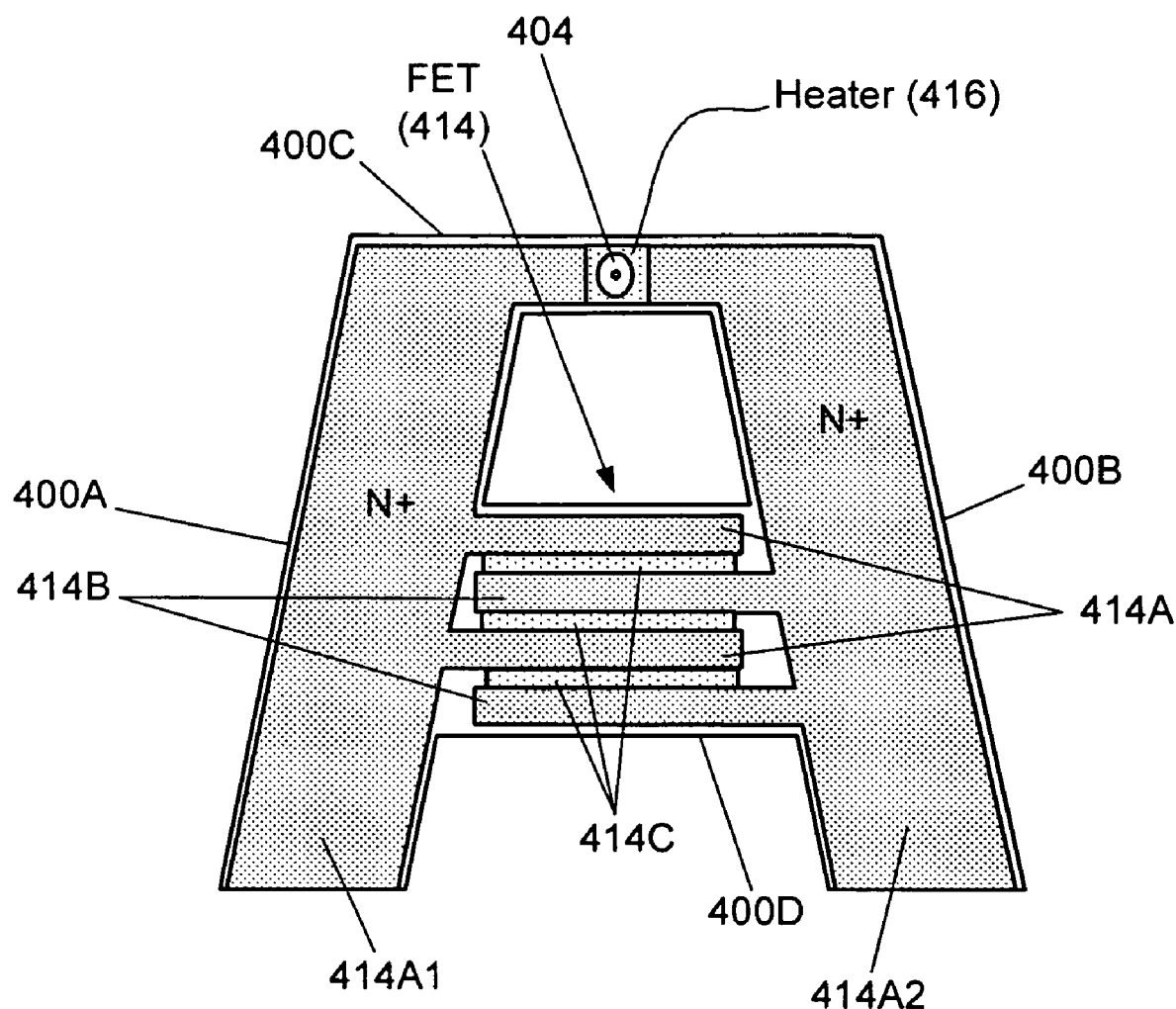
FIG. 6 is a schematic underside plan view of the cantilever showing a heater/FET arrangement according to a fourth embodiment of the invention.

FIG. 6 shows a fourth embodiment of the invention. In this embodiment the cantilever 400 includes two bridge portions 400C and 400D. The second bridge portion 400D is formed inboard of the end bridge on which the probe and heater are formed. The FET 414 is formed on the second bridge and thus isolated from the heater 416. The FET 414 is formed so as to have interdigitized drain and source portions 414A, 414B with channels 414C interposed therebetween in the illustrated manner. This interdigitizing or interlacing of the FET source and drain structures provides a higher W/L ratio and thus improves performance. This embodiment of course requires the structure of the cantilever to be modified. However, this modification is readily achieved using conventional etching techniques and as such no further disclosure of this is deemed necessary.

Figure 7:
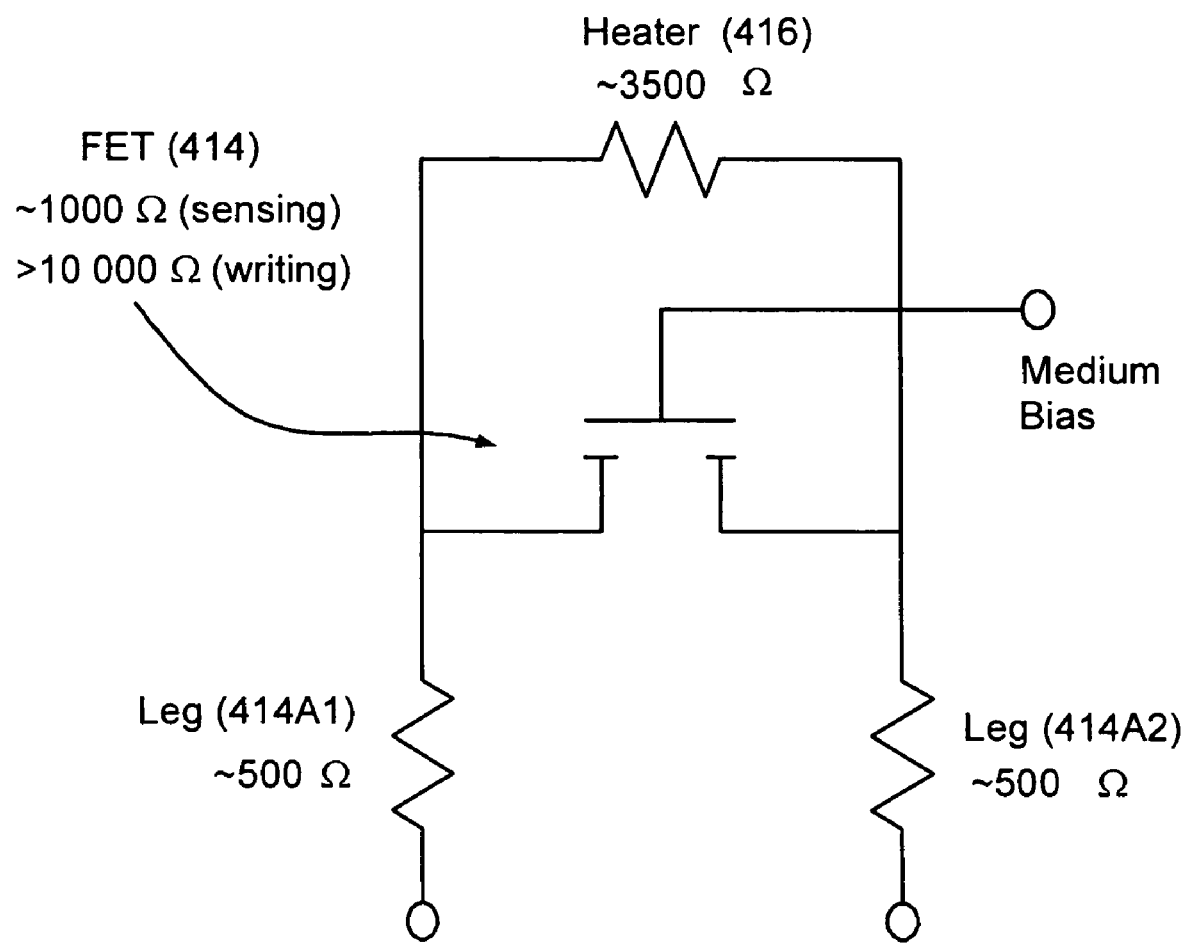
FIG. 7 is a circuit diagram showing the basic connection between the heater and the FET which is used in the embodiments of the invention.

FIG. 7 shows, in circuit diagram form, the arrangement which is established in FIG. 6. As will be appreciated from this diagram, the bias which is applied to the substrate 110 gates the FET structure 414 which is formed in the second bridge portion 400D of the cantilever 400. During the writing phase, the bias applied to the substrate 110 can be adjusted to a level where the FET 414 is rendered non-conductive and exhibits (by way of example) a resistance of more than 10,000Ω. This enables sufficient current to be supplied to the heater 416 via the legs 414A1 and 414A2, to elevate the temperature of the portion of the cantilever surrounding (and/or including) the probe 404, sufficiently to fuse and modify the topography of the medium 108 should the probe be induced to press down against the surface of the medium 108.

Conversely, during the sensing phase, the bias to the substrate 110 is elevated to a level wherein the FET can be gated and thus rendered conductive (thus exhibiting a resistance of 1000Ω for example). During this time, the high resistance of the heater (e.g. about 3500Ω) effectively directs a majority of the current flow through the FET 414 and the temperature of the heater falls to essentially ambient levels.

Figure 8:
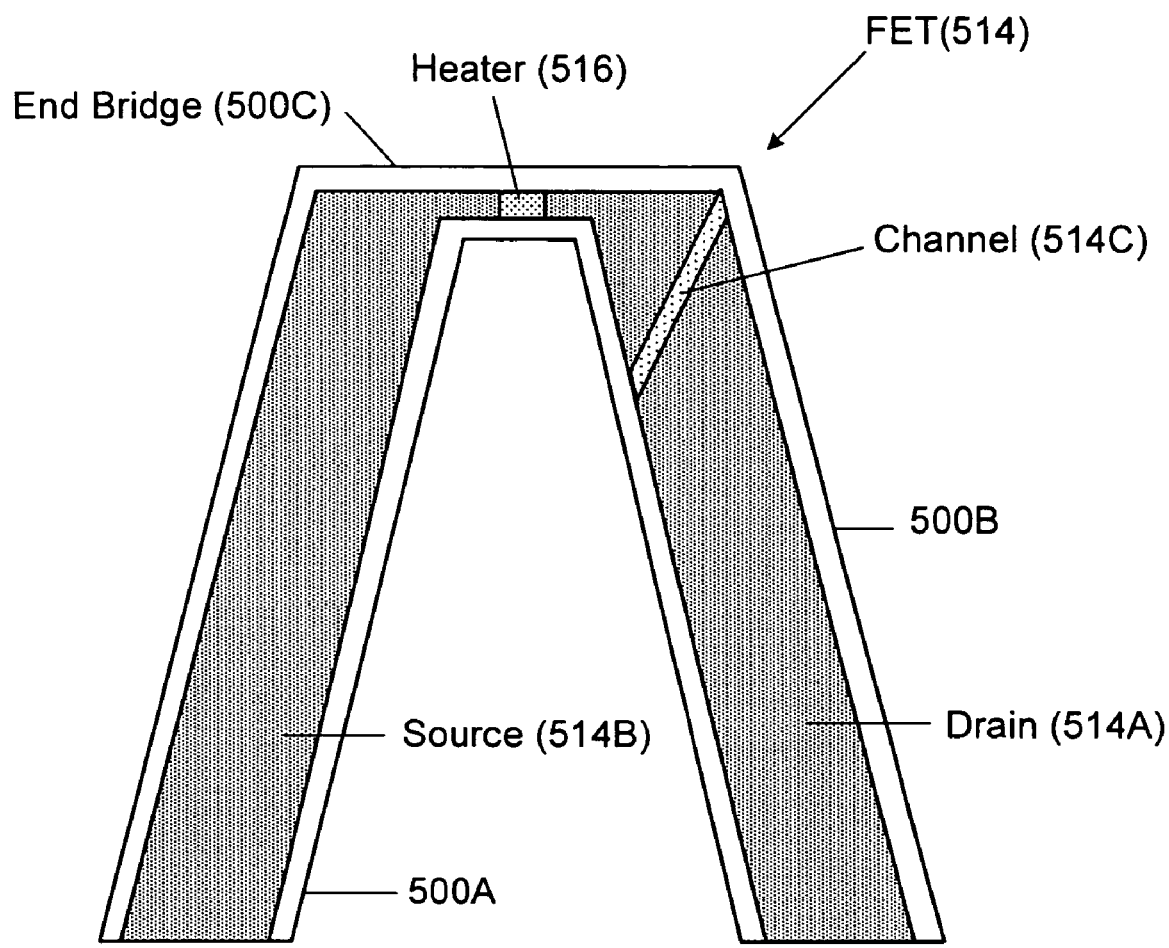
FIG. 8 is a schematic top plan view of a cantilever according to a fifth embodiment of the invention.

FIG. 8 shows a fifth embodiment of the invention. This arrangement is arranged so that the channel 514C of the FET 514 is asymmetrically formed at an angle between the source and drain 514B, 514A and such that it is arranged to one side of, and in series with the heater 516.

Figure 9:
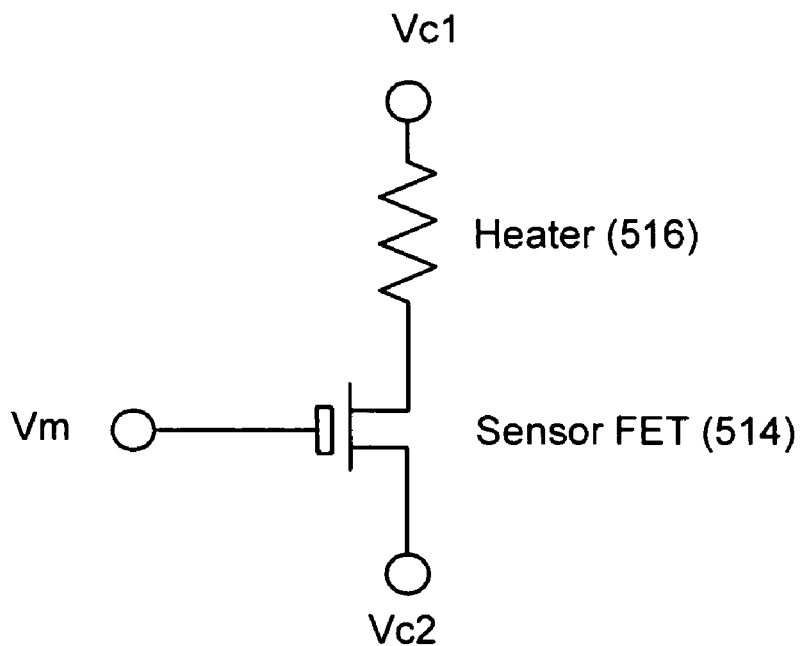
FIG. 9 is a circuit diagram showing how the heater element is serially connected with the FET in the arrangement depicted in FIG. 8.

FIG. 9 shows the FET 514 and the heater 516 in circuit diagram form. The gate on the read sensor FET is depicted as a "movable gate" indicating that it is located in the media rather than the cantilever.

Figure 10:
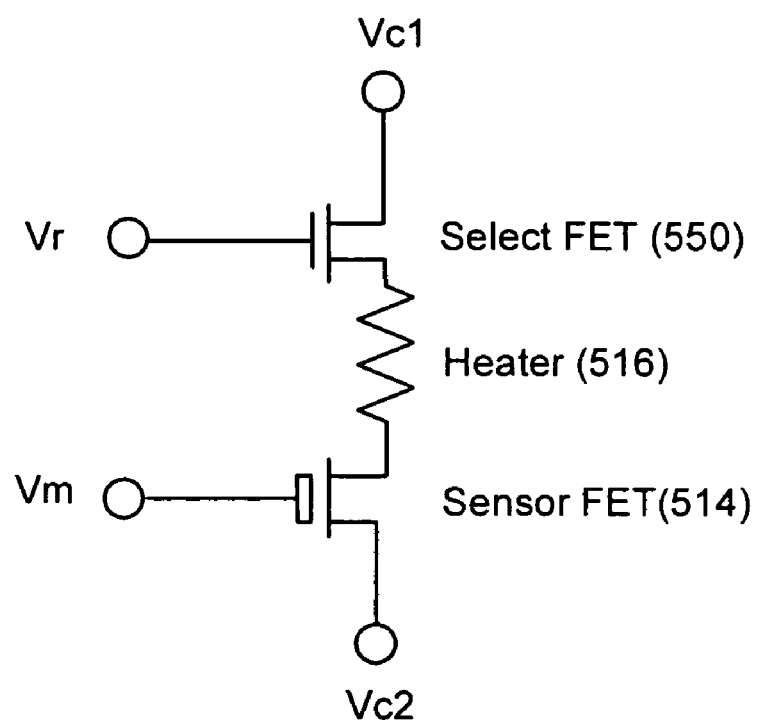
FIG. 10 is a circuit diagram showing the provision of a control switch (selection FET) which is located off the cantilever and which is serially arranged with the sensing FET and heating resistor.

To facilitate connection to an array of these cantilevers, a select FET 550 is added in series with the sensor FET 514 and the write heater (resistor) 516, in the manner schematically illustrated in FIG. 10. This select FET 550 is not formed on the cantilever 500, and is instead located on the cantilever base member 102 or die associated with the cantilever.

When the cantilever is not in use, the voltage on the gate of the select FET 550 is lowered to less than Vt above Vc1 and Vc2. This causes the cantilever select FET 550 to cutoff.

For reading, Vr is taken to a relatively high voltage to turn on the cantilever select FET 550. Vc1 is then taken to a relatively high voltage (Vcc-0.5V for example). Vc2 is placed relative to Vm to cause the desired DC current to flow (Vm-Vt).

For writing, Vr is taken to a relatively high voltage to turn on the cantilever select FET 550. Vc1 is taken to a relatively high voltage (Vcc). Vc2 is taken to a relatively low voltage in order to turn the sensor FET 514 on hard (gnd).

Figure 11:
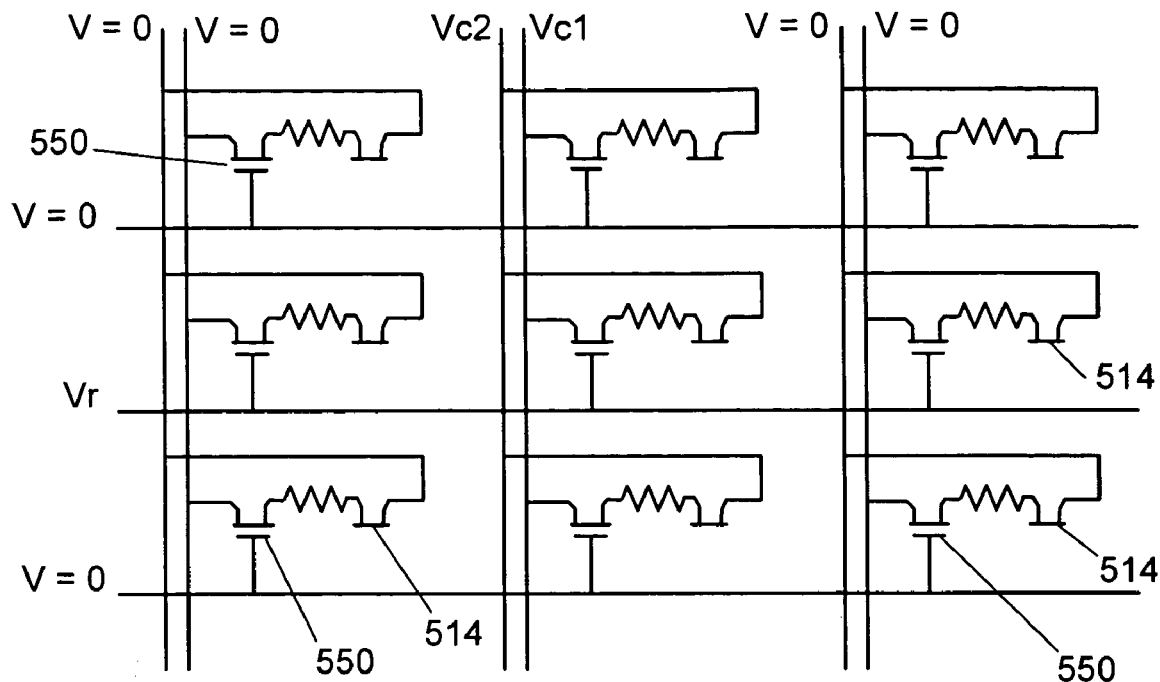
FIG. 11 is an example of a circuit showing how the selection FET is used in an array wherein the horizontal row are select lines that are used to enable any of the sensors along a row and wherein the voltages on the differential column lines are then manipulated in order to select a column.

An example of how the selection FET 550 is used in an array, is shown in FIG. 11. In this arrangement, the horizontal row select lines are used to enable any of the sensors along a row. The voltages on the differential column lines are then manipulated in order to select a column. The cantilever select FET could also be implemented as a P-channel device or it could be located between the read sensor FET and the Vc2 terminal. The operation of the read or sensor FET 514 is the same, the only difference being that the Vc2 terminal may be biased to a slightly lower voltage in order to accommodate the ON resistance of the cantilever select FET 550.

Figure 12:
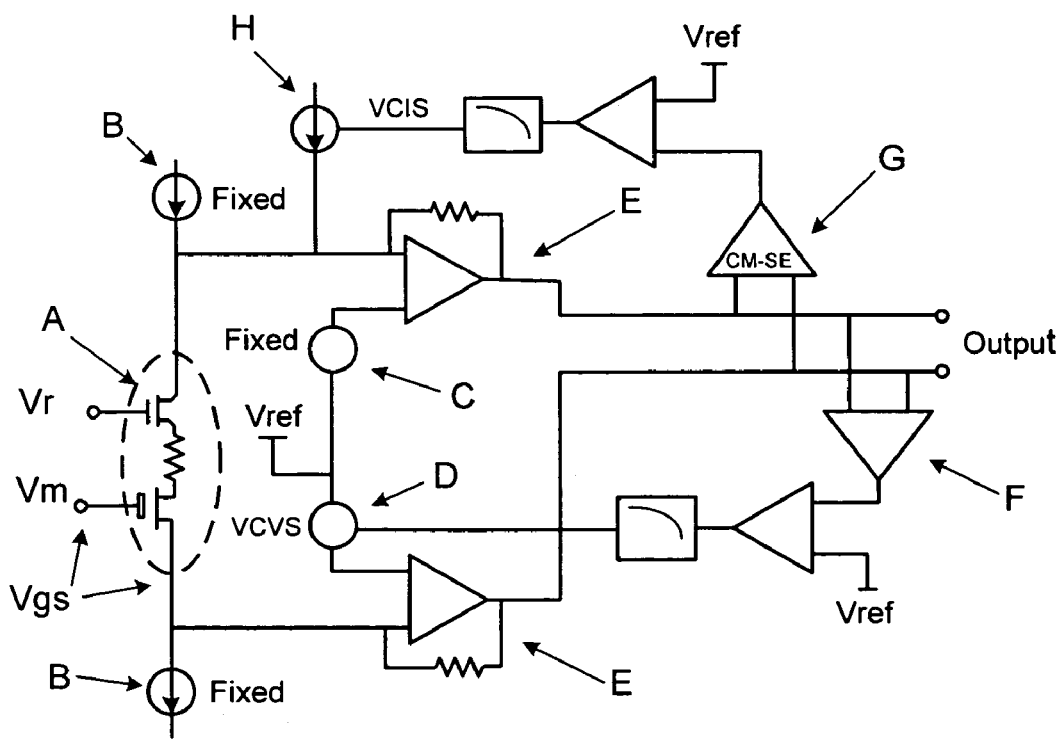
FIG. 12 is a diagram of a circuit which is arranged to bias the FET sensor for reading, eliminate unwanted DC from the signal and facilitate switching of the sensor FET.

To properly bias the sensor FET 514 for reading, eliminate unwanted dc from the signal and facilitate switching of the sensor FET 514, the circuit shown in FIG. 12 can be employed. This circuit works with either a serial combination circuit or with a parallel combination circuit. The main difference in the operation is in the write mechanism which is not addressed by this circuit.

As shown in FIG. 12, the circuit applies a fixed dc current to the serially connected sensor FET and write heater (generally denoted by A), using the current sources (B). The voltage sources (C&D) are used to set the voltage across the sensor FET and heater. The voltages are transferred to the sensor terminals via the virtual shorts of the trans-impedance amplifiers (E).

The voltage source C may be fixed or may operate symmetrically with the voltage source D. Having source C fixed may facilitate operation of the cantilever selection FET. The source D varies according to the differential output of the trans-impedance amplifiers. The differential output is converted to a single ended response by the differential to single ended converter (F). It is then filtered and fed to the voltage source D. This forms a feedback loop that will adjust the voltage from the FET sensor "gate" (Vm) to the FET sensor source (Vgs) such that it causes a current through the sensor FET that equals the current from the fixed sources (B). This achieves the desired Vgs by adjusting the voltage at the drain. This is useful because it allows the current to be adjusted without active control of the voltage on the media (Vm).

The media voltage will be shared among multiple cantilevers and therefore cannot be adjusted on a per cantilever basis. The circuit eliminates unwanted dc from the remainder of the read channel electronics since the differential output of the trans-impedance amplifiers is minimized by the biasing of the FET sensor.

If there is an imbalance in the fixed current sources (B), the result will be a common mode voltage at the output. In order to correct for imbalances in the fixed current sources, the feedback loop comprised of the common mode to single ended buffer (G), an amplifier, filter and voltage controlled current source (H) is used.

Figure 13:
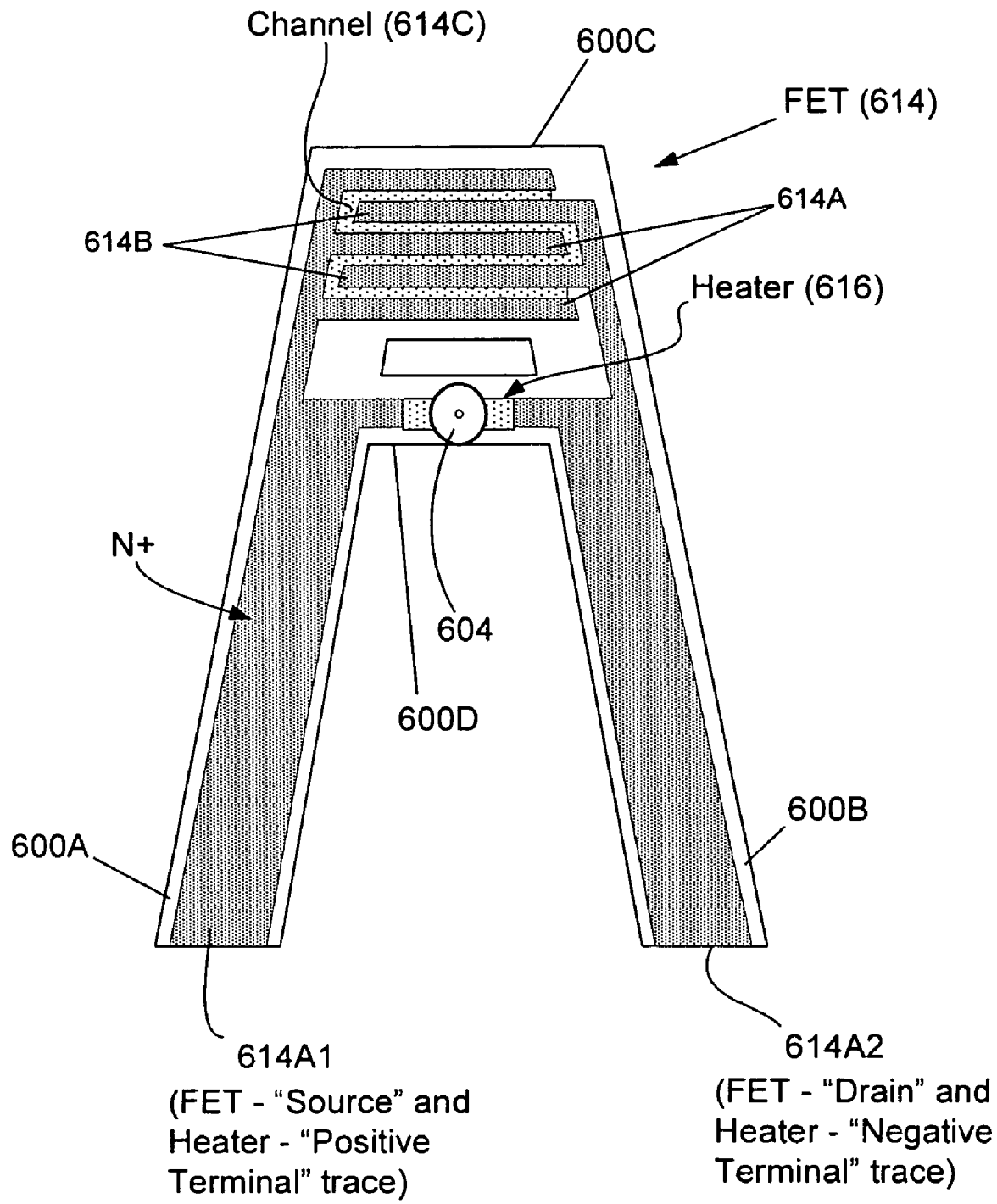
FIG. 13 is a schematic top plan view of a sixth embodiment of the invention.

FIG. 13 shows a sixth embodiment of the invention. This arrangement is basically similar to that which is shown in FIG. 6 and differs basically in that the disposition of the FET 614 and the heater 616 have been disposed on the first and second bridges 600C and 600D respectively. This allows the FET 614 to undergo a greater amount of movement in response to the probe 604 entering a pit and thus be brought into closer proximity with the medium and thus the source of electric field which is generated via the electrification of the substrate 110.

Figure 14:
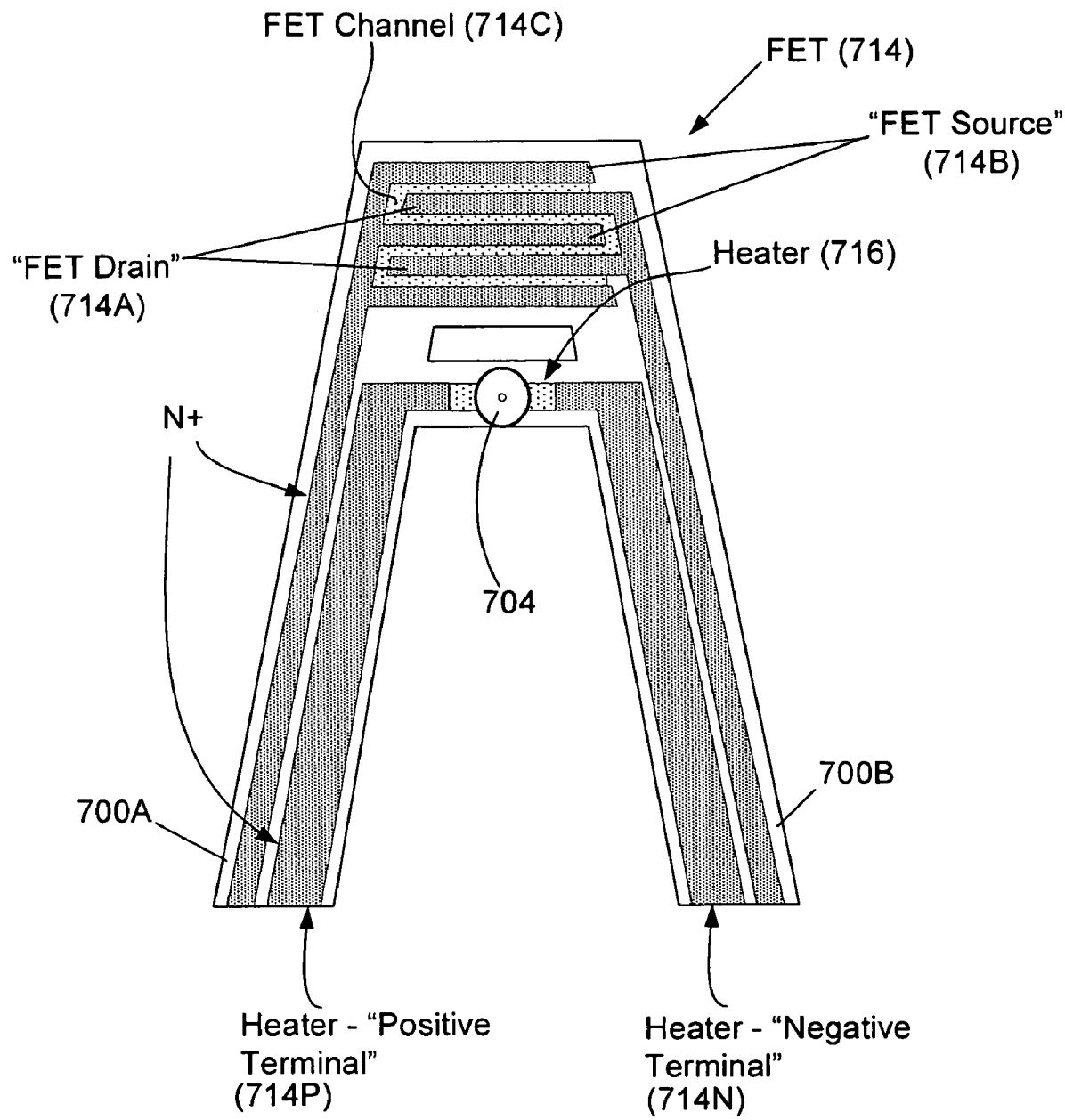
FIG. 14 is a schematic top plan view of a seventh embodiment of the invention.

FIG. 14 shows a seventh embodiment of the invention. This arrangement is similar in layout to that of the sixth embodiment and differs in that the heater 704 is provided with separate positive and negative traces or terminals 714P and 714N. This allows the signal from the FET 714 to be fed through traces which are electrically separated from those which define the heater circuit.

It will be noted in this and the previous embodiment, that while two connection bridges are disclosed, it is within the scope of the invention to merge the two and to have only one bridge member in the event that such a configuration is deemed advantageous.

Although the invention has been disclosed with reference to a limited number of embodiments, the various modifications and variations which can be made without departing from the scope of the invention, which is limited only by the appended claims, will be self-evident to those skilled in the art of Atomic Resolution Storage (ARS) and Contact Probe Storage (CPS) technology. For example, while the second-fourth embodiments shown in FIGS. 4-6, are shown using depletion mode FETs, they may be adapted to be induced-channel or enhancement mode FETs.

What is claimed is:

1. A read/write arrangement comprising:
   FET means formed in a silicon cantilever by doping electrically conductive source and drain regions in a selected surface of the cantilever, for being gated by an electric field which is generated by applying a bias to a substrate separate from the cantilever, wherein the electrical field changes with changes in distance between the substrate and the cantilever;
   a probe on the selected surface of the cantilever; and
   heater means in the cantilever proximate the probe for heating and forming a data bit indicative topography in a medium to be engaged by the probe.

2. A read/write arrangement as set forth in claim 1, wherein the cantilever has arms and an end bridge portion which interconnects terminal outboard ends of the arms, and wherein the probe and the heater are formed on the end bridge portion.

3. A read/write arrangement as set forth in claim 1, further comprising select switch means connected in series with the heater and the device for controlling the passage of current through the heater and device.

4. A read/write arrangement as set forth in claim 3, wherein the select switch comprises a FET (Field Effect Transistor).

5. A read/write arrangement as set forth in claim 3, further comprising:
   circuit means serially with the select switch, heater and device for applying a fixed dc current to the serially connected select switch, heater and device, using first and second current sources; and
   voltage control means having first and second voltage sources for controlling the voltage applied across the serially connected select switch, heater and device.

6. A read/write arrangement as set forth in claim 5, wherein the circuit is configured so that the voltages from the voltage sources are applied across the serially connected select switch, heater and device via virtual shorts of trans-impedance amplifiers.

7. A read/write arrangement as set forth in claim 1, wherein the FET means is configured to function as the heater.

8. A read/write arrangement as set forth in claim 1, wherein the source and drain regions are formed in the arms of the cantilever.

9. A read/write arrangement as set forth in claim 1, wherein the cantilever further comprises a second bridge between the arms of the cantilever and wherein source and drain portions of the FET are formed on the second bridge portion.

10. A read/write arrangement as set forth in claim 1, wherein:

a first drain region of the FET is formed on a first arm of the cantilever;

a first source region of the FET is formed on a first arm of the cantilever;

a second drain region of the FET is formed on a second arm of the cantilever;

a second source region of the FET is formed on a second arm of the cantilever; and a doped region on the end bridge portion which forms the heater, is electrically connected with one of the first and second source regions and the first and second drain regions.

11. A read/write arrangement as set forth in claim 10, wherein first and second channel portions are formed on the first and second arms respectively.

12. A read/write arrangement as set forth in claim 10, wherein the first and second drain regions are formed to have a common portion which spans the end bridge portion.

* * * * *

UNITED STATES PATENT AND TRADEMARK OFFICE
CERTIFICATE OF CORRECTION

PATENT NO. : 7,542,402 B2
APPLICATION NO. : 10/827370
DATED : June 2, 2009
INVENTOR(S) : Robert Guido Mejia and Richard Lee Hilton Page 1 of 1

It is certified that error appears in the above-identified patent and that said Letters Patent is hereby corrected as shown below:

On the Title Page, Item
(74) Attorney, Agent, or Firm – Robert P. Lenart, Esq.; Benjamin T. Queen, II; "Petragallo" Gordon Alfano Bosick & Raspanti, LLP
   should read
(74) Attorney, Agent, or Firm – Robert P. Lenart, Esq.; Benjamin T. Queen, II; "Pietragallo" Gordon Alfano Bosick & Raspanti, LLP Column 4, Line 52
During the read mode of operation, trace 114A, which extends continuously along both legs 100A, "1OOB" and across the end bridge 100C,...
   should read
During the read mode of operation, trace 114A, which extends continuously along both legs 100A, "100B" and across the end bridge 100C,...

Signed and Sealed this

Eighth Day of December, 2009

David J. Kappos
*Director of the United States Patent and Trademark Office*